(12) United States Patent
Ohta

(10) Patent No.: US 7,167,192 B2
(45) Date of Patent: Jan. 23, 2007

(54) IMAGE FORMING DEVICE

(75) Inventor: Yasunori Ohta, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 211 days.

(21) Appl. No.: 11/012,295

(22) Filed: Dec. 16, 2004

(65) Prior Publication Data

US 2005/0152734 A1 Jul. 14, 2005

(30) Foreign Application Priority Data

Dec. 19, 2003 (JP) .............................. 2003-422940

(51) Int. Cl.
*B41J 13/00* (2006.01)
(52) U.S. Cl. ...................... 347/139; 400/642; 347/218
(58) Field of Classification Search ................ 347/218, 347/228, 139, 153, 262, 264, 101, 104; 400/642
See application file for complete search history.

(56) References Cited

U.S. PATENT DOCUMENTS

| | | | | |
|---|---|---|---|---|
| 4,831,461 A | * | 5/1989 | Ohta et al. ................... | 358/296 |
| 6,812,946 B1 | * | 11/2004 | Torisawa et al. ............. | 347/228 |
| 6,814,506 B1 | * | 11/2004 | Nanami ....................... | 396/569 |
| 2003/0219248 A1 | * | 11/2003 | Nanami ....................... | 396/575 |
| 2005/0068516 A1 | * | 3/2005 | Okada ......................... | 355/405 |
| 2005/0134671 A1 | * | 6/2005 | Kojima ........................ | 347/194 |

FOREIGN PATENT DOCUMENTS

| JP | 5-45109 B2 | 7/1993 |
|---|---|---|
| JP | 9-274300 A | 10/1997 |

* cited by examiner

*Primary Examiner*—Huan Tran
(74) *Attorney, Agent, or Firm*—Sughrue Mion, PLLC

(57) ABSTRACT

An image forming device has a recording unit for recording a recording material in a sheet form in a major scanning direction based on an input image signal and a conveyance unit for conveying the recording material in a sub-scanning direction substantially perpendicular to the major scanning direction, wherein the image forming device is provided with a guide plate for guiding while the recording material comes into contact with the guide plate on an opposite surface of a recording side, the guide plate being provided at an image recording position in which the recording material is recorded by the recording unit, and a drive roller for conveying the recording material while pressing the recording material onto the guide plate, wherein the guide plate has a planar portion along a conveyance direction and an inclined portion bent toward a side of the recording unit, and the inclined portion is formed in only one end portion of the conveyance direction of the guide plate.

10 Claims, 9 Drawing Sheets

IMAGE FORMING DEVICE

This application is based on Japanese Patent application JP 2003-422940, filed Dec. 19, 2003, the entire content of which is hereby incorporated by reference.

BACKGROUND OF THE INVENTION

1. Technical Field of the Invention

The present invention relates to an image forming device for scan exposing a recording material in the sheet form with laser light and the like, and developing the recording material while conveying it.

2. Description of the Related Art

In recent years, in the medical field, an image forming device by a dry system which is free from use of solution based treating chemicals and does not require wet processing is watched from the viewpoints of environmental conservation and space saving. In this image forming device, for films of a photosensitive and heat-sensitive recording material or a heat development photosensitive material (hereinafter simply referred to as "recording material"), laser light is irradiated (scanned) in an exposure section to form a latent image; the recording material is heat developed upon contact with heating means in a heat development section; and after cooling, the recording material having an image formed therein is discharged from the device.

In this kind of image forming device, in irradiating the recording material with laser light to record image information therein, it is required to smoothly convey the recording material so as to give neither vibration nor impact, thereby ensuring a precise irradiation action of the laser light. According to such a demand, for example, in a light beam scanning device disclosed in JP-B-5-45109, there is described a construction in which a nip roller 5 is provided in the tip of an arm 3 swingablly centering around a swinging axis 1 as illustrated in FIG. 10. A transmission roller 7 is rotatably supported at the other end of the arm 3, and the transmission roller 7 and the nip roller 5 are tightly stretched by a belt 9 as rotation transmission means. The nip roller 5 is rotated via the belt 9 by rotation drive of a drive roller 11 slidably contacting with the transmission roller 7. A cam plate 15 in the disc form is connected via a swinging rod 13 in the arm 3 in the side of the nip roller 5, and the arm 3 is capable of swinging via the swinging rod 13 by the rotation of the cam plate 15.

In this construction, when a recording material 19 guided by a guide plate 17 reaches the drive roller 11, the drive roller 11 is rotated, and following this rotation, the nip roller 5 is rotated. At the same time, as illustrate in FIG. 10B, when the cam plate 15 is rotated in the counterclockwise direction, the swinging rod 13 rotates the arm 3 in the counterclockwise direction, and the nip roller 5 presses the tip portion of the recording material 19. As a result, when the recording material 19 is sandwiched between the nip roller and the drive roller 11, the recording material 19 does not receive an impact at all and is conveyed as it is. Accordingly, during this period, even when laser light is scanned to record image information on the recording material, no disturbance of the recorded image is generated.

However, when such a swinging mechanism by a nip roller is employed, since exclusive drive mechanism and drive source are required, not only the structure became complicated, but also the number of parts increased, resulting an increase of the production costs.

On the other hand, there is proposed a plate sub-scanning mode capable of surely conveying a recording material in the sheet form by a simple structure. In this plate sub-scanning mode, in a sub-scanning conveyance section 21 as illustrated in FIG. 11, two drive rollers 23, 25 are provided while sandwiching the major scanning line of laser light, and a guide plate 27 for supporting the recording material 19 is provided opposing to these drive rollers 23, 25. The guide plate 27 is provided with slope portions 29, 31 for warping the recording material 19 to be inserted between the guide plate 27 and the respective drive rollers 23, 25 along a part of each peripheral face of the drive rollers; and a press portion 33 composed of substantially horizontal planes for receiving an elastic repulsive force caused by the warp of the recording material 19 between the drive rollers upon contact therewith.

In this construction, when the recording material 19 enters from the tip of the slope portion 29, the tip of the recording material 19 comes into a space between the guide plate 27 and the drive roller 23. At this time, since the press portion 33 and the slope portion 29 of the guide plate 27 are bent at a prescribed angle $\phi$, when the recording material 19 moves into the press portion 33 from the slope portion 29, it warps, and an elastic repulsive force is generated in the recording material itself by this warp. By this elastic repulsive force, a prescribed friction force is generated between the recording material 19 and the drive roller 23, and a conveyance drive force is surely transmitted into the recording material 19 from the drive roller 23, thereby smoothly conveying the recording material 19.

Also, the recording material to be used in this type of image forming device has a plural number of sizes such as B4 (257×364 mm), HANSETSU (14×17 inch), and MUTSUGIRI (8×10 inch). For this reason, in the conventional image forming devices, magazine trays for accommodating a recording material are provided for every size, and all of these trays are detachably installed in the multi-stage state in the lower portion of the device, etc., thereby making it possible to cope with a variety of sizes.

However, in the foregoing image forming device of a plate sub-scanning mode, though it is possible to smoothly convey the recording material 19 by a simple structure without giving a vibration or an impact as compared with the nip roller mode as illustrated in FIG. 10, the guide plate 29 composed of the slope portions 29, 31 and the press portion 33 is required to have an extremely high dimensional accuracy, an aspect of which became a factor to increase the production costs of device.

Also, for the purpose of enabling the image forming device to cope with a variety of sizes of recording materials, it generally accommodates a plural number of trays accommodating recording materials of a different size in the multi-stage state. For this reason, the size of the device becomes large, an aspect of which was contradictory to the demand for compactness. Also, the recording material of the uppermost layer of each tray is allowed to stand in the exposed state within the device. In the case of a recording material having high sensitivity to the humidity, and in the case of a user who does not consume a large amount of the recording material, there was the possibility that the exposed recording material is dried out to cause a fluctuation of the density (scattering such that the density is not precisely expressed). On the other hand, there are proposed a shutter mechanism in which a discharge port of the tray is opened only at the time of discharging the recording material; and a mechanism in which at the time of discharging the recording material, an open and close seal is wound and a discharge port is opened, and after discharging, the discharge port is again sealed by means of adhesion of the open and close seal. However, all of these mechanisms are complicated, an aspect of which was contradictory to the demand for compactness, resulting an increase of the costs of the device.

On the other hand, in order to enhance the sealing properties, there is proposed a heat development device using a rolled recording material as illustrated in FIG. 12 and disclosed in JP-A-9-274300. This heat development device makes it possible to use both a cut recording material and a rolled recording material. That is, whether the recording material is a cut recording material 35 or a rolled recording material 37 is detected by a form judgment unit 39. The form judgment unit 39 is provided with a sensor 41 provided in an introduction passage of the cut recording material 35 and a sensor 43 provided in an introduction passage of the rolled recording material 37. In this heat development device, the rolled recording material 37 in which a latent image has been previously formed by laser light is accommodated in a magazine 45. The rolled recording material 37 sent out from the magazine 45 is conveyed into a heating furnace 47, held by a heater drum 51 to be rotation driven by a motor 49, and then heat developed by heating of a halogen heater 53. That is, this heat development device does not convey an unexposed recording material.

Accordingly, though feed of the rolled recording material is carried out, this heat development device does not aim to ensure the sealing properties of an unexposed recording material but aims to make it possible to use both the cut recording material and the rolled recording material. For this reason, this heat development device is provided with a mechanism for feeding both the cut recording material and the rolled recording material and is contradictory to the demand for the compactness. Also, though this heat development device has a construction of use of the rolled recording material, it is not provided with a countermeasure to a recording material that when allowed to stand in the exposed state, may possibly cause a density fluctuation.

Under these circumstances, the invention has been made.

SUMMARY OF THE INVENTION

A first object of the invention is to provide an image forming device capable of making the production easy as compared with conventional guide plates, thereby aiming to realize smooth conveyance of a recording material and to reduce the production costs of device. Also, a second object of the invention is to provide an image forming device which can always provide a high image quality even in the case of a user who consumes only a small amount of recording material and can achieve compactness of a device to a large extent as compared with conventional devices that must be provided with cartridges having a different size in the multi-stage state.

The objects can be attained by adoption of the following constitution, thereby achieving the invention.

More specifically, the invention is as follows:

(1) An image forming device comprising:

a recording unit for recording to a recording material in a sheet form in a major scanning direction based on an input image signal; and a conveyance unit for conveying the recording material in a sub-scanning direction substantially perpendicular to the major scanning direction, wherein the image forming device is provided with a guide plate for guiding the recording material while the recording material comes into contact with the guide plate on an opposite surface of a recording side, the guide plate being provided at an image recording position in which the recording material is recorded by the recording unit, and a drive roller for conveying the recording material while pressing the recording material onto the guide plate, and wherein the guide plate has a planar portion along a conveyance direction and an inclined portion bent toward a side of the recording unit, and the inclined portion is formed in only one end portion of the conveyance direction of the guide plate.

According to this image forming device, the inclined portion is formed in only one end portion of the conveyance direction of the guide plate, and therefore, its production is easy as compared with conventional guide plates in which the inclined portion is provided in both end positions of the conveyance direction. In this way, a guide plate having a simple structure is used, and it becomes possible to achieve smooth conveyance of the recording material by an inexpensive device.

(2). The image forming device as described in (1), wherein the recording unit is a laser irradiation unit for irradiating the recording material with a laser light modulated based on the image signal.

According to this image forming device, since the recording unit is a laser irradiation unit, the image formation by laser light can be carried out.

(3). The image forming device as described in (1) or (2), wherein the image forming device has two drive rollers which are aligned while sandwiching a conveyance path including the image recording position of the recording material and in which respective axis lines thereof are substantially in parallel to the conveyance path and substantially perpendicular to the conveyance direction; and wherein a one-sided drive roller of the two drive rollers is supported facing the vicinity of the bending point of the inclined portion, and the other-sided drive roller is supported facing the planar portion of the guide plate.

According to this image forming device, when the recording material enters between the one-sided drive roller and the inclined portion, the recording material warps in the course of movement from the inclined portion to the planar portion, and an elastic repulsive force is generated in the recording material by this warp. By this elastic repulsive force, a prescribed friction force is generated between the recording material and the one-sided drive roller, whereby a conveyance drive force is surely transmitted into the recording material from the drive roller.

(4). The image forming device as described in (3), wherein the drive roller facing the planar portion of the guide plate is supported in such a manner that it can freely approach to or leave from the planar portion, thereby making it possible to achieve nip or nip release of the recording material.

According to this image forming device, in the course that the tip of the recording material to be transported along the planar portion of the guide plate reaches the drive roller, the drive roller is aligned in the leaving direction from the planar portion, whereby a fluctuation of the conveyance rate of the recording material caused by collision contact between the tip portion of the recording material and the drive roller, i.e., a fluctuation of the sub-scanning rate, is prevented.

(5). The image forming device as described in any one of (1) to (4), the recording material is a rolled body wound in a rolled shape.

According to this image forming device, it is possible to realize a structure from which the recording material can be discharged and which can be easily sealed.

(6). The image forming device as described in (5), wherein the image forming device is provided with a recording material cartridge in a detachable manner, in which the rolled recording material is accommodated in a closed vessel having light shielding properties, and the recording material is sent out and fed into the conveyance unit.

According to this image forming device, the recording material is shielded from the external atmosphere, whereby management of the humidity can be easily realized. In addition to this, since it is possible to exchange a recording material cartridge having a different size, the image formation with a different size can be achieved. Also, it is possible to achieve space saving of a recording material accommodation section within the device as compared with the construction provided with cartridges having a different size in the multi-stage state.

(7). The image forming device as described in (5) or (6), a curl direction of the recording material wound in the rolled shape and a bending direction of the recording material by the guide plate are set up in an opposite direction to each other.

According to this image forming device, when the recording material enters between the drive roller and the guide plate, a large elastic repulsive force is generated in the recording material as compared with the case where the curl direction and the bending direction by the guide plate are identical. This elastic repulsive force contributes to a drive roller contact pressure of the recording material.

(8). The image forming device as described in any one of (5) to (7), wherein the image forming device is provided with a recording material cutting unit for cutting the recording material sent out from the recording material cartridge into a desired size; and wherein a distance $L_1$ from a recording material outlet of the recording material cartridge to the recording material cutting unit and a distance $L_2$ from the image recording position of the recording material to a central position of the drive roller in the side of the planar portion of the guide plate have a relation of $L_1 \geq L_2$.

According to this image forming device, before the image-unformed region of the recording material has reached the image recording position, the tip portion of the recording material is put into the drive roller in the side of the planar portion, whereby it becomes possible to achieve the image formation after stabilizing the conveyance of the recording material.

(9). The image forming device as described in (8), wherein after the tip of the recording material has reached the image recording position, the recording material is subjected to idle feeding in a length of the distance $L_2$, and writing is then started.

According to this image forming device, after the recording material has been subjected to idle feeding in a length of the distance $L_2$, writing is started. Therefore, when the recording material is sandwiched by the both drive rollers, the image formation is started. In this way, the image formation can be carried out in the state that the image recording position of the recording material is held in the stable plane along the planar portion of the guide plate.

(10). The image forming device as described in any one of (5) to (7), wherein the image forming device is provided with a recording material cutting unit for cutting the recording material sent out from the recording material cartridge into a desired size; and wherein a distance $L_1$ from a recording material outlet of the recording material cartridge to the recording material cutting unit and a distance $L_2$ from the image recording position of the recording material to a central position of the drive roller in the side of the planar portion of the guide plate have a relation of $L_1 \leq L_2$.

According to this image forming device, at the point of time when the image-unformed region of the recording material reaches the drive roller, the image-unformed region of the recording material is always aligned at the image recording position. In this way, in starting the recording while sandwiching the upper stream side and the downstream side of the conveyance direction of the recording material by the two drive rollers, the recording start position is always consistent with the image-unformed region.

According to the image forming device of the present invention, comprising a guide plate for guiding while coming into contact with the back surface of the recording material and drive rollers for conveying the recording material while pressing it onto the guide plate are provided, and an inclined portion bent in the side of the recording unit is formed in only one end portion of the conveyance direction of the guide plate. Accordingly, it is possible to make the production easy as compared with conventional guide plates in which an inclined portion is provided in both end portions of the conveyance direction. As a result, the production costs of device can be reduced by employing the plate sub-scanning mode capable of making the structure simple while realizing smooth conveyance of the recording material.

DETAILED DESCRIPTION OF THE INVENTION

Preferred embodiments of the image forming device according to the present invention will be described below in detail with reference to the accompanying drawings.

Figure 1:
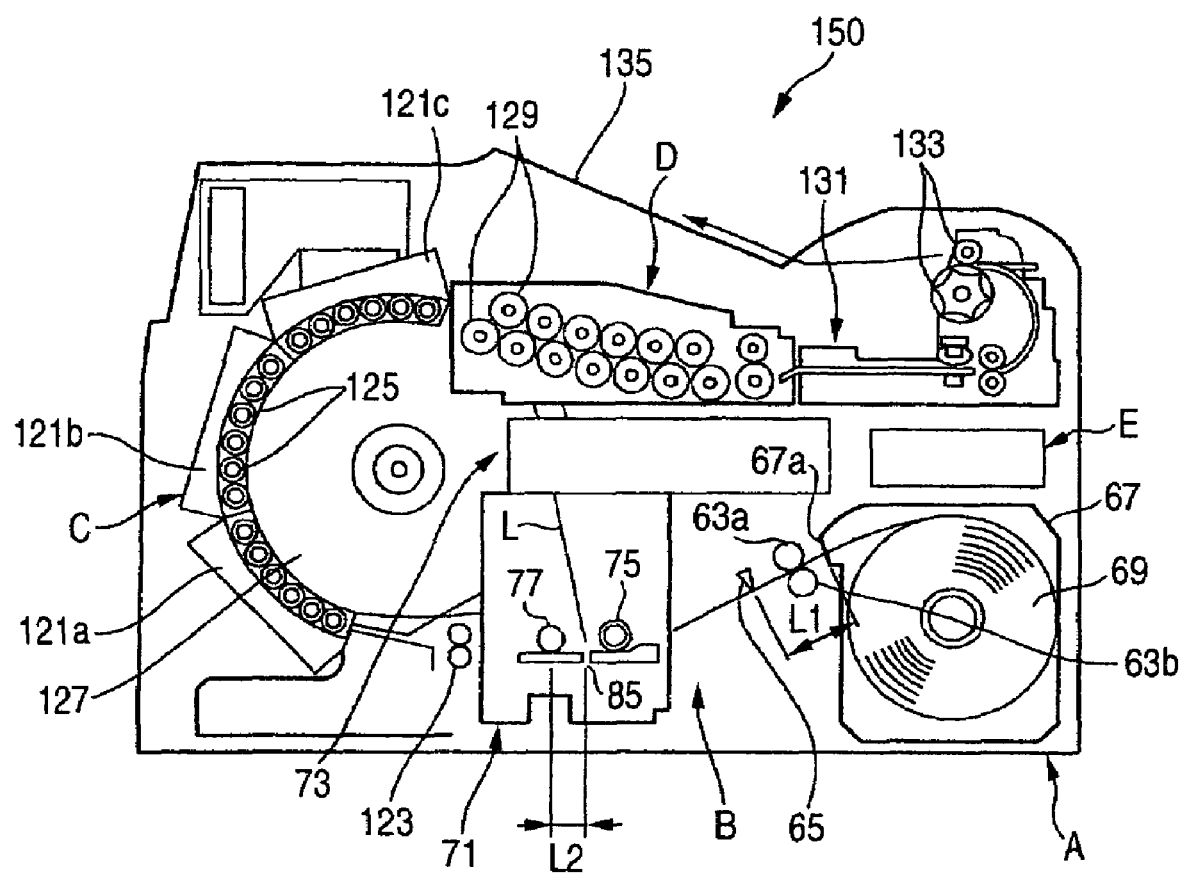
FIG. 1 is a constructive view to schematically show the image forming device according to the invention.

FIG. 1 is a constructive view to schematically show the image forming device according to the invention.

An image forming device 150 is a device in which using a recording material which does not require wet development processing, the recording material is exposed by means of scan exposure with light beams composed of laser light to form a latent image, then heat developed to obtain a visible image, and followed by cooling to the ordinary temperature. This image forming device 150 is basically provided with a recording material feed section A, an image exposure section (corresponding to laser recording means) B as recording means, a heat development section C, and a cooling section D in the order of the conveyance direction of the recording material. Also, the image forming device 150 is provided with conveyance means for conveying the heat development recording material provided at important points among the respective sections and a power supply/control section E for driving and controlling the respective sections.

In the image forming device 150, the recording material feed section A and the image exposure section B are aligned close to each other. According to this construction, a conveyance path length of the recording material to the image exposure section B can be made shortest. The recording material feed section A is provided with a recording material charging section 61, feed roller pairs 63a, 63b, and a cutter 65 as recording material cutting means. A recording material cartridge 67 is charged detachably into the recording material charging section 61. A rolled recording material 69 wound in the rolled shape is accommodated in this recording material cartridge 67.

Figure 2:
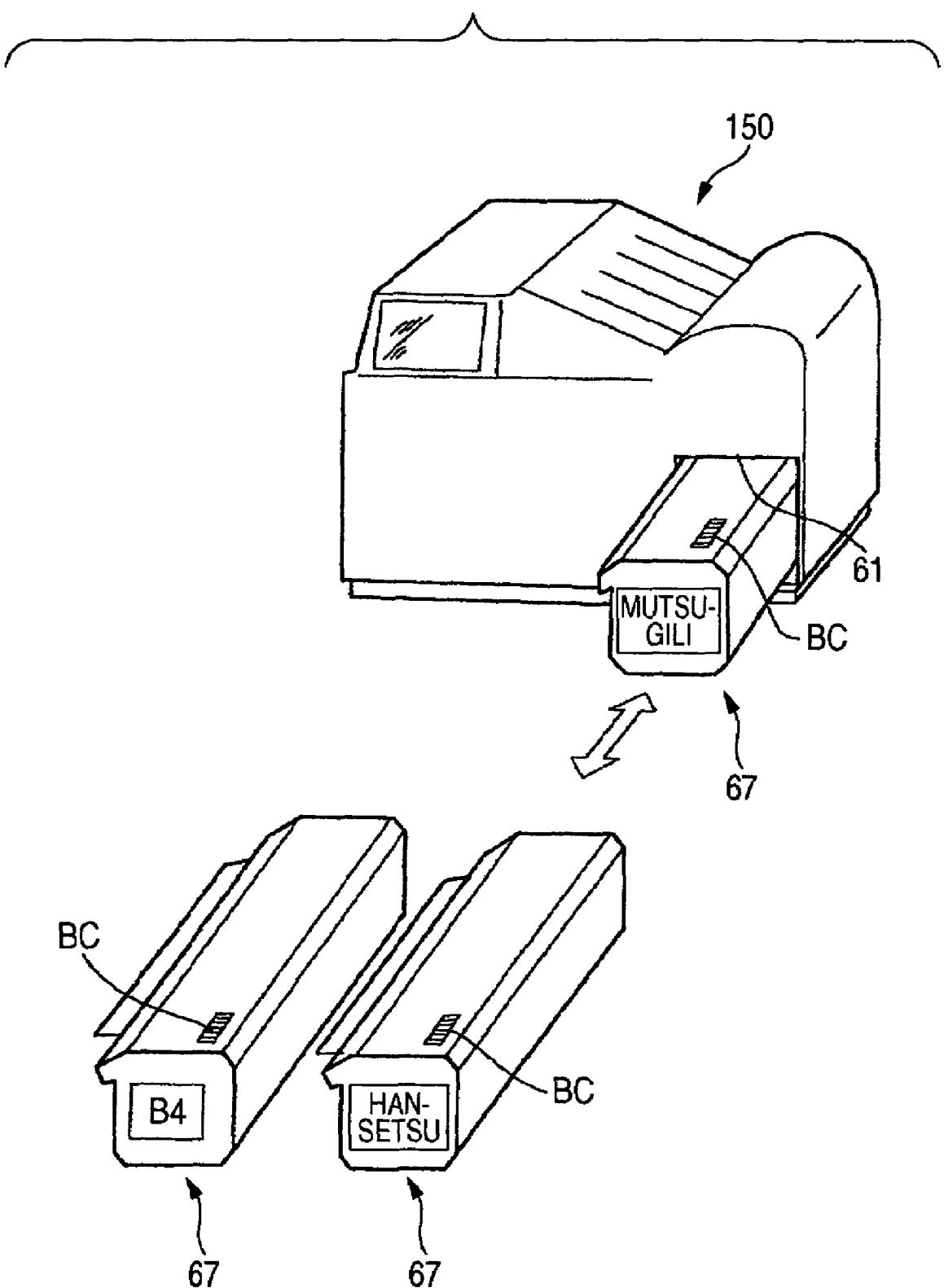
FIG. 2 is an explanatory view to show the detachment state of a recording material cartridge.
Figure 3:
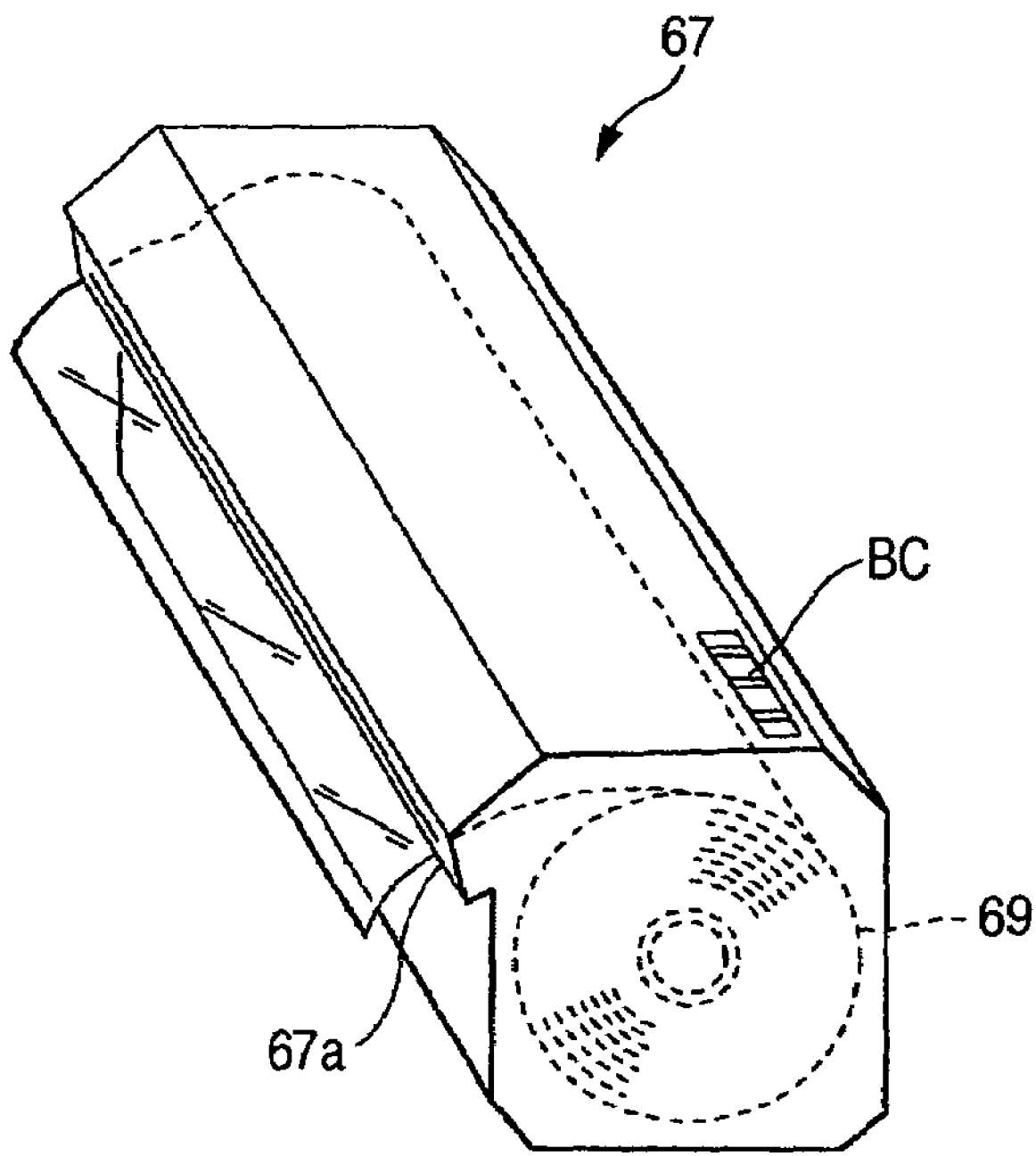
FIG. 3 is a perspective view of the recording material cartridge illustrated in FIG. 2.

FIG. 2 is an explanatory view to show the detachment state of the recording material cartridge; and FIG. 3 is a perspective view of the recording material cartridge illustrated in FIG. 2. For the recording material cartridge 67, plural kinds of cartridges are arranged depending upon the size of the recording material 69 to be accommodated (for example, B4 (257×364 mm), HANSETSU (14×17 inch), and MUTSUGIRI (8×10 inch)). In charging the recording material cartridge 67 into the recording material charging section 61 corresponding to the size, input into the power supply/control section E of the image forming device 150 is carried out manually by a user or by detecting a bar code BC attached to the external face of the cartridge by a recognition sensor within the charging section.

In the recording material cartridge 67, a case is formed so as to have sealing properties, the inside becomes an accommodation space of the rolled recording material 69, and this accommodation space is opened to a recording material outlet 67a. That is, in the recording material 69, the tip thereof in the sending-out side is drawn out from the recording material outlet 67a. The recording material outlet 67a is provided with, for example, a non-illustrated sealing member in the brush shape, and the sealing member seals a gap with the recording material 69 while making it possible to draw out the recording material 69. In this way, a structure enabling one to draw out the recording material 69 and having high sealing properties is realized.

According to the recording material feed section A, since the recording material cartridge 67 accommodating the recording material 69 in the rolled shape is provided detachably, management of the humidity can be easily carried out by shielding the recording material 69 from the external atmosphere. In this way, deterioration of the recording material 69 can be prevented so that the storage period of the recording material 69 can be prolonged. Accordingly, even in the case of a user who consumes only a small amount of recording material, a high image quality can be always provided. In addition to this, by exchanging the recording material cartridge 67 into one having a different size, it becomes possible to achieve the image formation with a varied size and to achieve compactness of the device to a large extent as compared with conventional devices that must be provided with cartridges having a different size in the multi-stage state.

The tip portion drawn out from the recording material outlet 67a of the recording material cartridge 67 is sandwiched by the feed roller pairs 63a, 63b and when the feed roller pairs 63a, 63b are rotated, is sent out from the recording material cartridge 67. The cutter 65 is aligned in the downstream side of the recording material conveyance direction of the feed roller pairs 63a, 63b and cuts the recording material 69 sent out by the feed roller pairs 63a, 63b into a prescribed length. Cutting of the recording material 69 is carried out by detecting the sending-out length of the recording material 69 from the rotation amount of the feed roller pairs 63a, 63b or by a non-illustrated sensor and controlling the actuation of the cutter 65 by the power supply/control section E based on the detected value.

The image exposure section B scan exposes the recording material 69 having been conveyed from the recording material feed section A with light beams L in the major scanning direction and conveys the recording material 69 in the sub-scanning direction substantially perpendicular to the major scanning direction, thereby recording a desired image on the recording material 69 to form a latent image.

Next, the heat development section C will be described below.

The heat development section C heats a recording material to be heated, which is of a type to which heat treatment is applied. With respect to the construction of the heat development section C, as illustrated in FIG. 1, a plural number of plate heaters 121a, 121b, 121c lined in the transport direction of the recording material, as heating bodies which will reach a temperature necessary for processing the recording material 69, are curved, and these plate heaters 121a, 121b, 121c are aligned in the series arc shape.

With respect to the construction of the heat development section C including these plate heaters 121a, 121b, 121c, as illustrated, each plate heater is provided with a concave face, and the recording material 69 is slipped and relatively moved while bringing the recording material 69 into contact with the concave face of each plate heater. At this time, as transport means of the recording material 69, a feed roller 123 and a plural number of press rollers 125 which also function for achieving heat conduction into the recording material 69 from each plate heater are aligned. The press rollers 125 are engaged with a drive gear 127 in the tip of the axis direction and rotation driven following the rotation of the drive gear 127. As these press rollers 125, a metal roller, a resin roller, a rubber roller, and the like can be utilized. By this construction, since the recording material 69 to be conveyed is conveyed while being pressed onto the plate heaters 121a, 121b, 121c, buckling of the recording material 69 can be prevented from occurring. And, non-illustrated discharge rollers for transporting the recording material 69 are aligned in the end terminal of the conveyance path within the heat development section C.

As a matter of course, the foregoing curved plate heater is one embodiment, and constructions provided with an endless belt and a peel claw using other flat plate heater or heating drum may be employed.

And, the recording material 69 having been conveyed out from the heat development section C is cooled in the cooling section D while being conveyed by the cooling roller pairs 129 by taking care such that it does not generate a wrinkle and that it does not get into a habit of crook. The recording material 69 discharged from the cooling section D is guided into a guide plate 131 provided on the way of the conveyance path and further discharged into a discharge tray 135 from a discharge roller pair 133.

A plural number of cooling roller pairs 129 are aligned within the cooling section D so as to give a desired constant curvature R to the conveyance path of the recording material 69. This means that the recording material 69 is conveyed at a constant curvature R until the recording material 69 is cooled to not higher than the glass transition point of the material thereof. By intentionally imparting a curvature to the recording material 69, excessive curl disappears before the recording material 69 is cooled to not higher than the glass transition point. When the recording material 69 becomes not more than the glass transition point, curl is not newly imparted, and the curl amount does not scatter.

Next, the image exposure section B corresponding to a laser recording device which is a characteristic part of the invention will be specifically described below.

Figure 4:
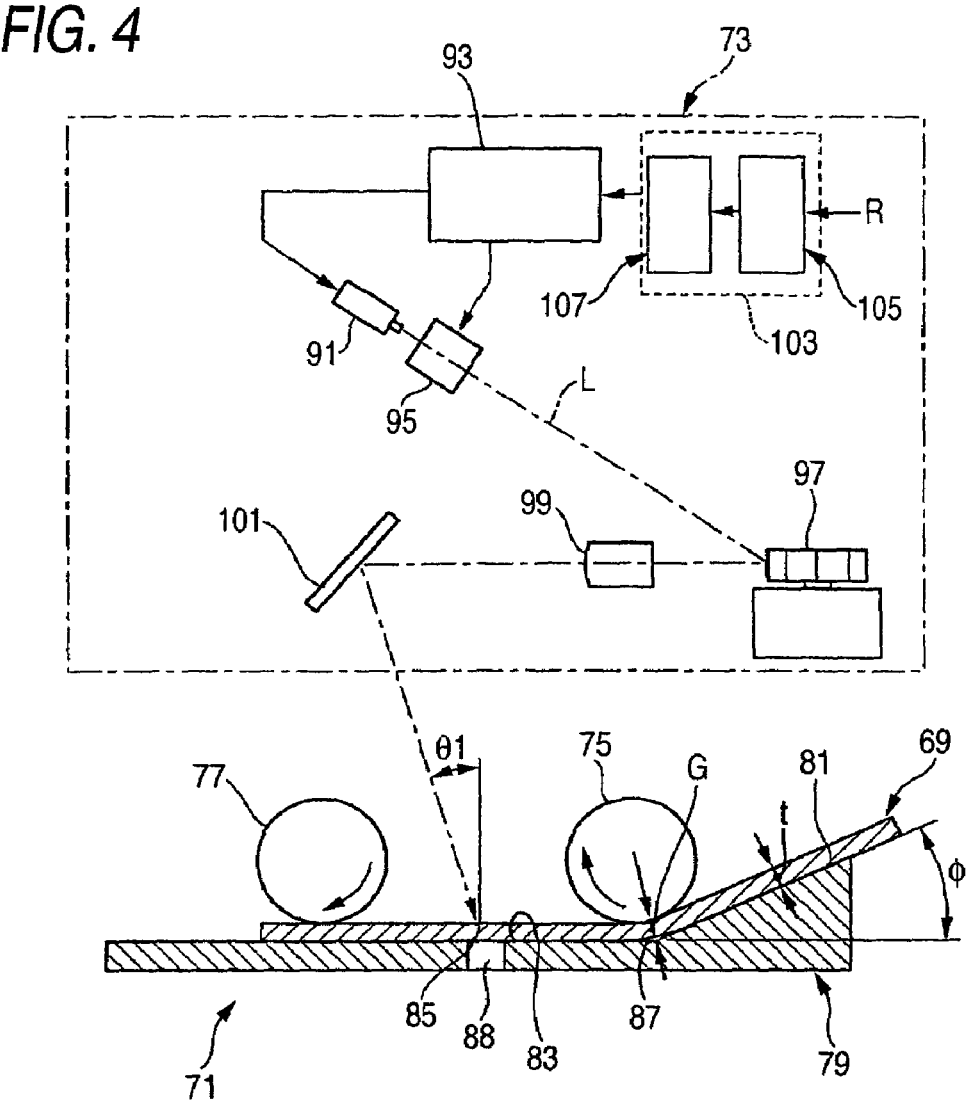
FIG. 4 is a detailed explanatory view of an image exposure section illustrated in FIG. 1.
Figure 5:
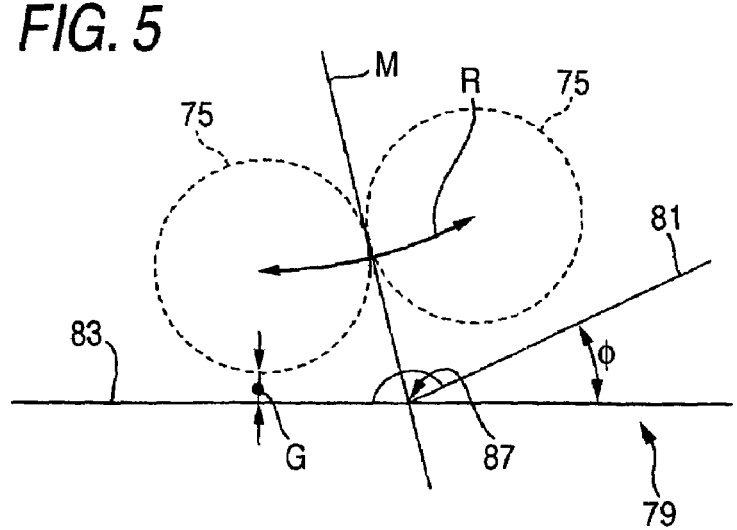
FIG. 5 is an enlarged view to show the relative relation between a guide plate and a drive droller.

FIG. 4 is a detailed explanatory view of the image exposure section B illustrated in FIG. 1; and FIG. 5 is an enlarged view to show the relative relation between a guide plate and a drive droller.

The image exposure section B is a site for exposing the recording material by scan exposure with light beams and is provided with a sub-scanning conveyance section (sub-scanning means) 71 having a preventing flutter mechanism for conveying while preventing flutter from the conveyance face of the recording material 69 and a scan exposure section 73. The scan exposure section 73 scans laser while controlling an output of the laser according to a separated prepared image data. The scanning direction when the scanning light is projected on the recording material 69 is the major scanning direction, and the direction substantially perpendicular to the major scanning direction is the sub-scanning direction (i.e., the conveyance direction). In this way, the recording material 69 is moved in the sub-scanning direction by the sub-scanning conveyance section 71.

The sub-scanning conveyance section 71 is provided with two drive rollers 75, 77 aligned in such a manner that a major scanning line of laser light to be irradiated as illustrated in FIG. 4 is sandwiched therebetween and their axis lines are substantially in parallel to the scanning line; and a guide plate 79 supporting the recording material 69, which is aligned opposing to these drive rollers 75, 77. The guide plate 79 is provided with an inclined portion (slope portion) 81 for warping the recording material 69 to be inserted between the guide plate 79 and the respective drive rollers 75, 77 along a part of each of the peripheral faces of the drive rollers outside a space between the drive rollers; and a planar portion (press portion) 83 composed of substantially horizontal planes for receiving an elastic repulsive force caused by the warp of the recording material 69 between the drive rollers upon contact therewith.

The slope portion 81 is an inclined face connected bent in the boundary portion with the press portion 83, and a crossing angle $\phi$ between the slope portion 81 and the press portion 83 is set up in the range of from 0° to 45°. The guide plate 79 is provided at a laser irradiation position 85 against the recording material 69 by the scanning exposure section 73 and guides while coming into contact with the back face in the opposite side to the laser irradiating face of the recording material 69. The slope portion 81 is bent in the laser irradiation side as the recording means side and formed in only one end portion of the conveyance direction of the guide plate 79. In the present embodiment, the slope portion 81 is provided in the end portion in the upper stream side on the conveyance direction of the recording material 69.

The drive rollers 75, 77 are aligned while sandwiching the conveyance path including the laser irradiation position 85 of the recording material 69, and the respective axis lines thereof are substantially in parallel to the conveyance path and substantially perpendicular to the conveyance direction. The one-sided drive roller 75 of the two drive rollers 75, 77 is supported facing the vicinity of the bending point of the slope portion 81, and the other-sided drive roller 77 is supported facing the press portion 83.

The drive roller 75 receives a drive force of non-illustrated drive means such as a motor via transmission means such as gears and belts and is rotated in the clockwise direction in FIG. 4. The drive roller 77 has the same construction as the drive roller 75 and is provided facing the press portion 83 for discharging the recording material 69.

Here, the drive roller 75 will be described below as an example. As illustrated in FIG. 5, the drive roller 75 is aligned opposing to a bending portion 87 as a boundary portion between the press portion 83 and the slope portion 81. It is preferable that the alignment position of the drive roller 75 against the guide plate 79 falls within the range R where a straight line M passing through the bending portion (turning point of angle) 87 of the guide plate 79 and dividing an internal angle (180°−$\phi$) of the guide plate into two equal parts comes into contact with the external periphery of the drive roller 75. Incidentally, the relation between a diameter of the drive roller 75 and a length of the guide plate 75 is not particularly limited.

Also, the drive roller 75 is aligned in such a manner that a prescribed gap G is formed between the peripheral face thereof and the guide plate 79. It is preferable that this gap G is in the range of from en equal thickness to a 10-fold thickness of the wall thickness (t) (see FIG. 4) of the recording material 69 ($t \leq G \leq 10t$). Incidentally, the gap G as referred to herein means the minimum size among gaps at arbitrary positions of the guide plate 79.

In the construction of the foregoing sub-scanning conveyance section 71, when the recording material 69 enters from the tip of the slope portion 81, the tip of the recording material 69 comes into the space between the guide plate 79 and the drive roller 75. At this time, since the press portion 83 and the slope portion 81 of the guide plate 79 are bent at a prescribed angle $\phi$, when the recording material 69 moves into the press portion 83 from the slope portion 81, it warps, and an elastic repulsive force is generated in the recording material itself by this warp. By this elastic repulsive force, a prescribed friction force is generated between the recording material 69 and the drive roller 75, and a conveyance drive force is surely transmitted into the recording material 69 from the drive roller 75, thereby conveying the recording material 69.

Also, when the recording material 69 enters between the other-side drive roller 77 and the press portion 83, the conveyance direction of the recording material 69 is pressed onto the guide plate 79 by the two drive rollers 75, 77, and the recording material 69 between the drive rollers, which will become the laser irradiation position 85, is held in the stable plane along the flat press portion 83. That is, flutter in the vertical direction is suppressed. By irradiating laser light against the recording material 69 between the drive rollers, it is possible to perform good recording free from a deviation of the exposure position.

In this way, by forming the slope portion 81 in only one end portion of the conveyance direction of the guide plate 79, the production becomes easy as compared with the conventional guide plates in which a slope portion is provided in both end portions of the conveyance direction. In this way, the guide plate 79 having a simple structure is used, whereby it becomes possible to achieve smooth conveyance of the recording material 69 by an inexpensive device. Also, since no slope portion is provided in the downstream side, the tip of the recording material does not cause collision contact with the slope portion in the downstream side, whereby it becomes possible to achieve the conveyance more smoothly.

Incidentally, when the recording material 69 comes into the space between the guide plate 79 and the drive roller 75, since the gap G between the drive roller 75 to be rotated in the clockwise direction and the guide plate 79 is set up in the range of from en equal thickness to a 10-fold thickness of the wall thickness (t) of the recording material 69, vibration of the drive roller 75 caused by disturbance, etc. does not affect the conveyance of the recording material 69. That is, in the case where the foregoing disturbance is generated, since the disturbance is absorbed by an elastic force (displacement in the wall thickness direction) of the recording material 69, it does not affect the conveyance.

As illustrated in FIG. 4, the scan exposure section 73 polarizes laser light L modulated depending upon an image signal in the major scanning direction and makes it incident at a prescribed recording position X and is provided with a laser light source 91 for injecting laser light of a narrow wavelength region (wavelength: 350 nm to 900 nm) depending upon spectral sensitivity characteristics of the recording material 69, a recording control unit 93 for driving the laser light source 91, a cylindrical lens 95, a polygon mirror 97 as a light polariscope, an fθ lens 99, and a cylindrical mirror 101 for last fold down.

Incidentally, besides, various optical members to be aligned in known light beam scan exposure devices, such as a collimator lens and a beam expander for forming light beams injected from the laser light source 91, an optical face tangle error correction for laser scanning system, and a mirror for optical path adjustment are aligned, if desired in the scan exposure section 73. Incidentally, the recording beam diameter of the laser light on the recording material 69 is set up at from φ50 to φ200 μm. In particular, it is preferable that the recording beam diameter in the sub-scanning direction is small because the interference region is reduced.

Here, the image recording is carried out by pulse width modulation as an exposure mode. The recording control unit 93 drives the laser light source 91 by pulse width modulation depending upon the recorded image and injects light beams having been pulse width modulated depending upon the recorded image. The laser light L injected from the laser light source 91 is polarized in the major scanning direction by the polygon mirror 97 and light modulated by the fθ lens 99 so as to form an image at the laser irradiation position 85, and made incident at the laser irradiation position 85 at a prescribed incident angle θi upon selection of an optical path by the cylindrical mirror 101. That is, the laser light L is irradiated against the recording material 69 at an incident angle θi having an inclination of from 4° to 15° in the sub-scanning direction from the normal of the recording material 69 within a plane in parallel to the normal direction and sub-scanning direction (conveyance direction) of the recording material 69. Also, the guide plate 79 of the portion corresponding to the laser irradiation position 85 has a void 88 such that the recording material 69 is not fogged by reflected light by laser.

An image data from an image data supply source R such as CT and MRI is sent to an image processing unit 103. The image processing unit 103 is composed of a combination of various image processing circuits and memories and constructed of a density correction section 105 for carrying out density correction and an image processing section 107 for carrying out a variety of image processing such as sharpness correction. In the image processing unit 103, an image data (image information) is received from the image data supply source R and subjected to a variety of correction and processing, whereby it is converted into a heat-sensitive recorded image data corresponding to heat-sensitive recording.

Figure 6:
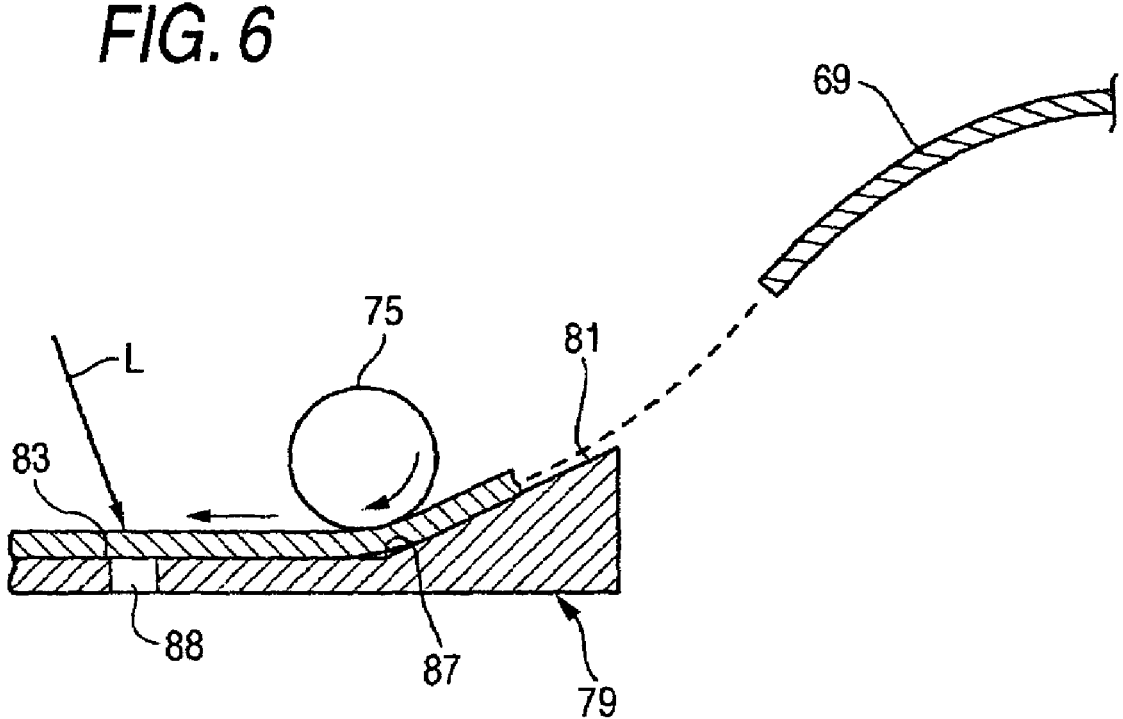
FIG. 6 is an explanatory view to show the relation between the entrance direction of a recording material to a guide plate and the curl direction of the recording material.

FIG. 6 is an explanatory view to show the relation between the entrance direction of the recording material against the guide plate and the curl direction of the recording material.

In the image forming device 150, the recording material 69 in the rolled shape is accommodated in the recording material cartridge 67, and the curl direction of the recording material 69 wound in the rolled shape and the bending direction of the recording material 69 by the guide plate 79 are set up in the opposite direction to each other. That is, as illustrated in FIG. 6, when the recording material 69 which has fallen into the habit of down-turn by the curl enters the guide plate 79, it passes through the bending portion 87 which is the boundary between the slope portion 81 and the press portion 83, whereby it is bent in the V-shape of the reverse direction.

Accordingly, when the recording material 69 enters between the drive roller 75 and the guide plate 79, a large elastic repulsive force is generated in the recording material 69 as compared with the case where the curl direction and the bending direction by the guide plate 79 are identical. Thus, a conveyance drive force can be surely transmitted into the recording material 69 from the drive roller 75. Also, the curl imparted in the recording material 69 can be cured.

Figure 7:
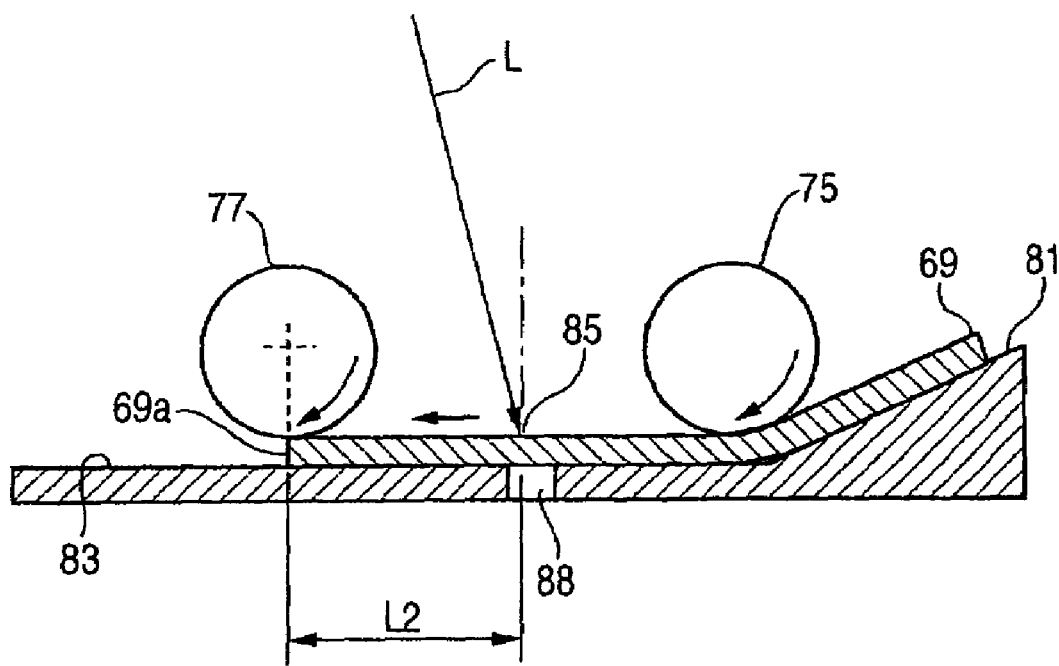
FIG. 7 is an explanatory view to show the relation between distances $L_1$ and $L_2$.
Figure 8:
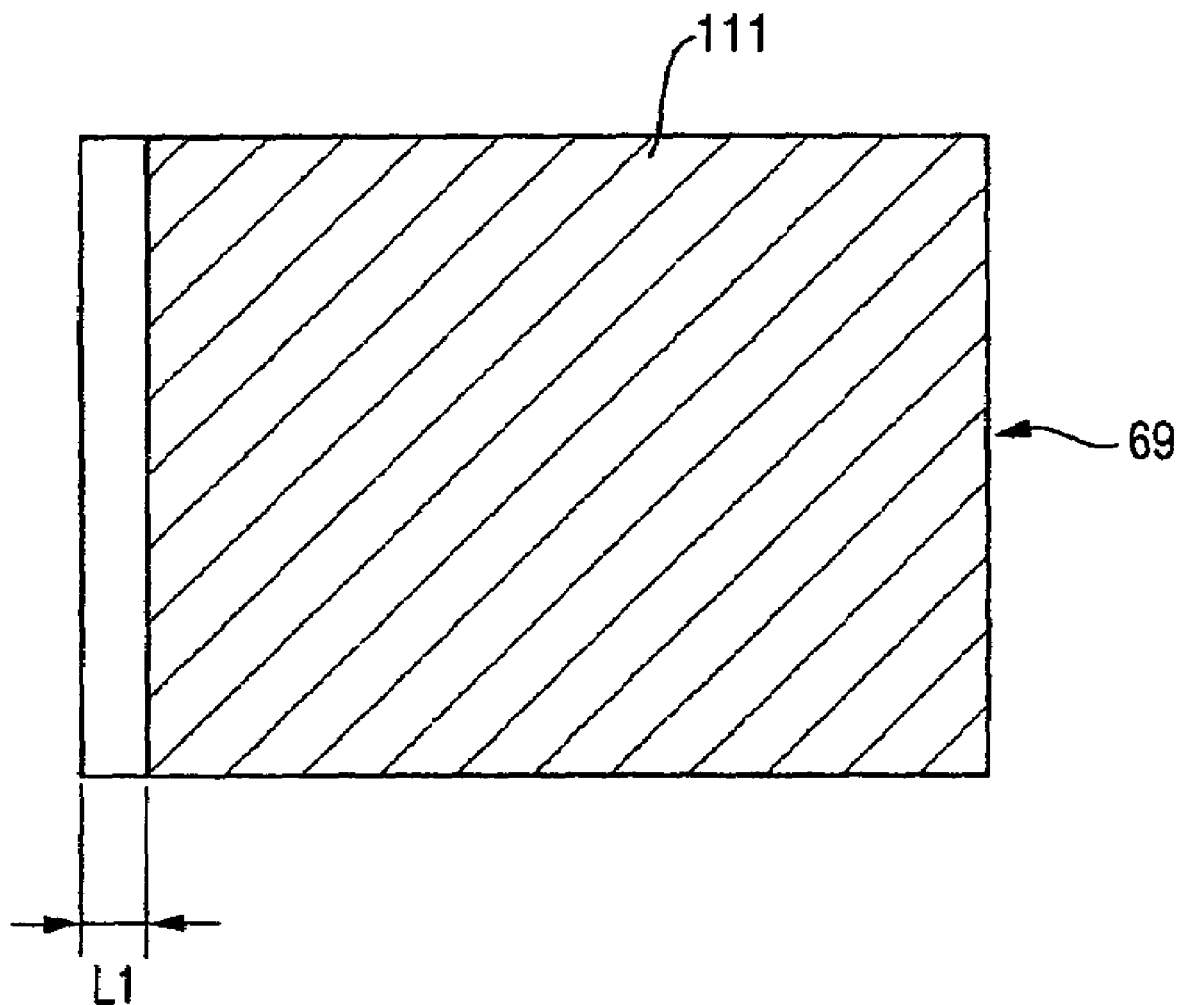
FIG. 8 is a plan view to show a non-writing area of a recording material.

FIG. 7 is an explanatory view to show the relation between the distances $L_1$ and $L_2$; and FIG. 8 is a plan view to show a non-writing area of the recording material.

In the image forming device 150 according to the invention, a distance between the recording material cartridge 67 and the cutter 65 and a distance between the recording material 69 and the drive roller 77 are set up in a prescribed relation. That is, a distance $L_1$ from the recording material outlet 67a of the recording material cartridge 67 illustrated in FIG. 1 to the cutter 65 and a distance $L_2$ from the laser irradiation position 85 as the image recording position of the recording material 69 to a central position of the drive roller 77 in the side of the press portion 83 of the guide plate 79 are herein set up in a relation of $L_1 \geq L_2$.

In this way, since the distance $L_1$ from the recording material outlet 67a to the cutter 65 is set up equal to or larger than the distance $L_2$ from the laser irradiation position 85 of the recording material 69 to the central position of the drive roller 77, it is possible to put a tip portion 69a of the recording material 69 into the drive roller 77 before an image-unformed region 111 illustrated in FIG. 8 has reached the image irradiation position 85. In this way, the image formation after stabilizing the conveyance of the recording material 69 becomes possible, whereby disturbance of the recorded image can be surely prevented.

Also, by such setting-up, a margin of a difference between the distance $L_2$ until the central position of the drive roller 77 and the distance $L_1$ from the recording material outlet 67a to the cutter 65 ($L_1-L_2$) is always ensured in the tip side of the recording material 69. In this way, this margin can be effectively utilized as an ID writing portion, etc.

Also, after the tip of the recording material 69 has reached the image recording position, the recording material 69 is subjected to idle feeding in a length of the distance $L_2$, whereby the recording material 69 is grasped by both the drive rollers 75, 77. In this way, the image formation can be stably carried out in the state that the image recording position of the recording material 69 is held in the stable plane along the planar portion of the press portion 83.

Incidentally, in the image forming device 150, even when setting-up is performed in the reverse way, the effective results can be obtained. That is, the distance $L_1$ from the recording material outlet 67a to the cutter 65 is set up equal to or smaller than the distance $L_2$ from the laser irradiation position 85 of the recording material 69 to the central position of the drive roller 77 ($L_1 \leq L_2$). According to such setting-up, at the point of time when the tip portion 69a of the recording material 69 has reached the drive roller 77, the image-unformed region 111 of the recording material 69 is always aligned at the image recording position 85, and writing into a photosensitive region can be surely prevented. Incidentally, the photosensitive region as referred to herein means a region within the range of $L_1$.

FIG. 9 is a constructive view to schematically show a deformation example wherein the drive roller is aligned swingablly in the planar portion side.

Incidentally, while the case where the drive rollers 75, 77 have the same construction has been described previously, the drive roller 77 facing the press portion 83 of the guide plate 79 may be constructed in such a manner that it can freely approach to or leave from the press portion 83, thereby making it possible to achieve nip or nip release of the recording material 69 at an arbitrary timing. As this construction, there can be enumerated a structure in which the drive roller 77 is supported at one end of an arm 115 whose other end is swingable centering around a swinging axis 113, and a drive rod 117 connected to a non-illustrated cam plate is connected to the arm 115. In this way, the arm 115 is swinged by the movement of the drive roller 117, thereby making it possible to achieve nip or nip release of the drive roller 77.

Figure 9A:
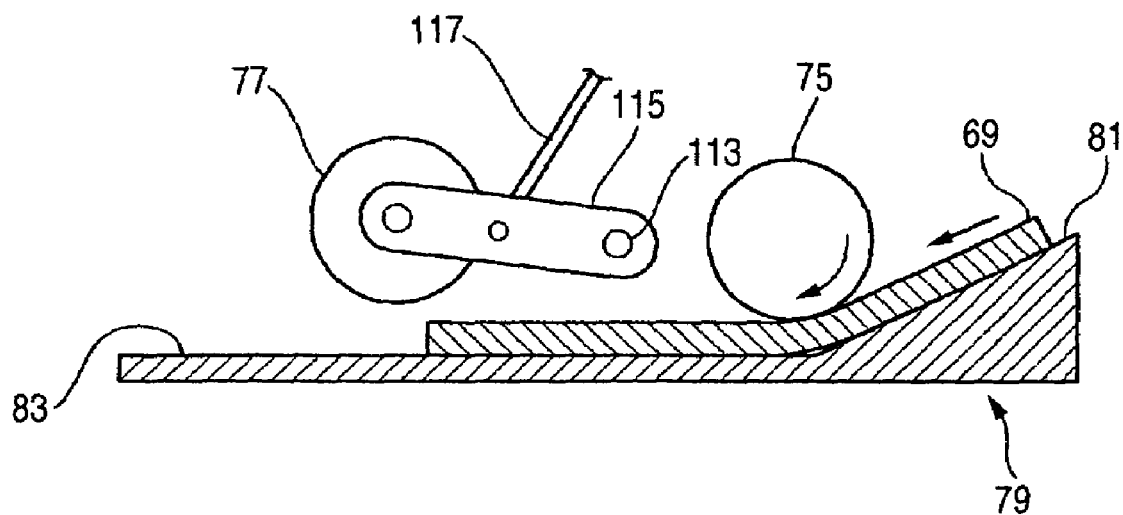
FIGS. 9A & 9B are constructive views to schematically show a deformation example wherein a drive roller is aligned swingablly in the planar portion side.
Figure 9B:
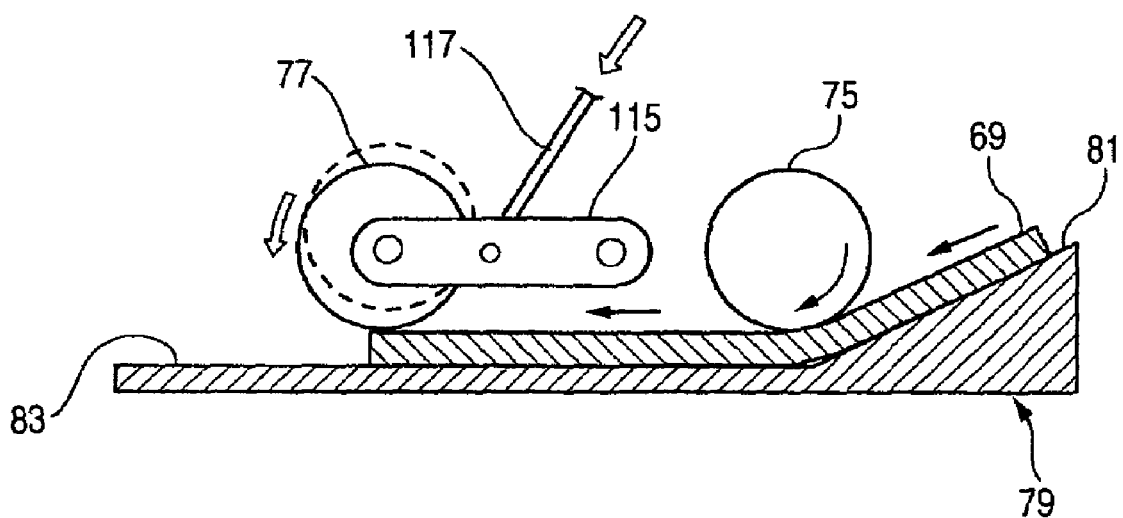
Figure 10A:
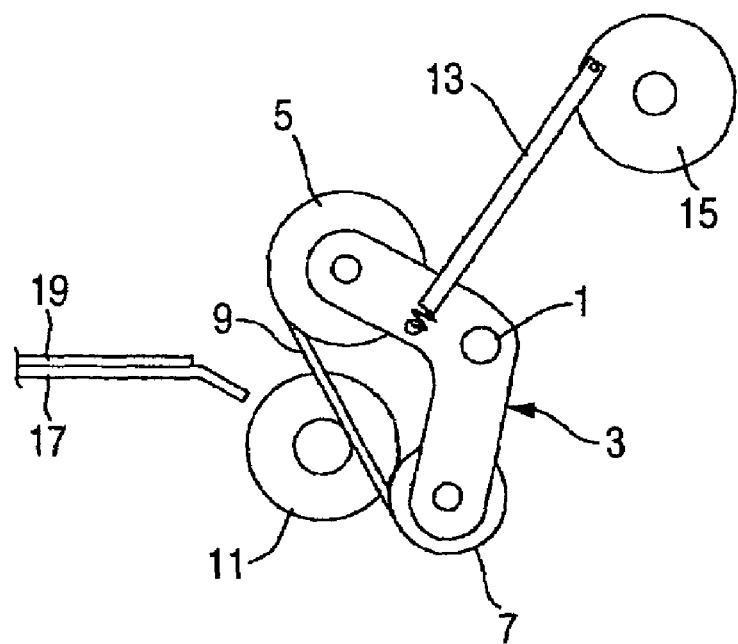
FIGS. 10A & 10B are explanatory views of a conventional swingable nip roller mechanism.
Figure 10B:
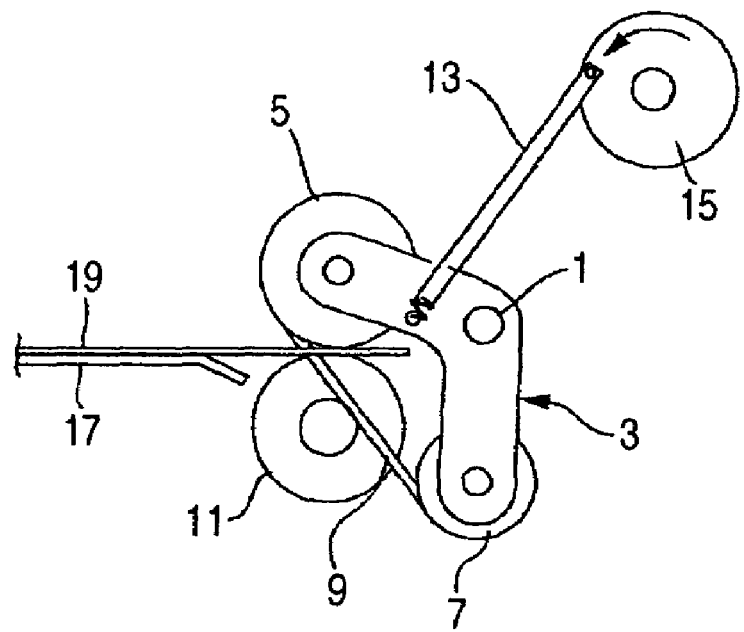
Figure 11:
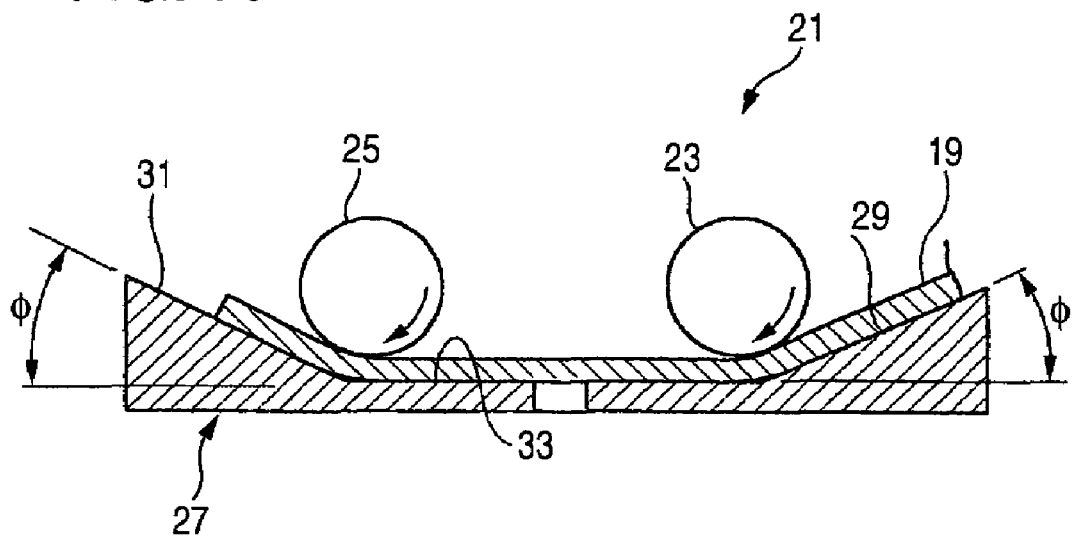
FIG. 11 is a side view of a conventional guide plate.
Figure 12:
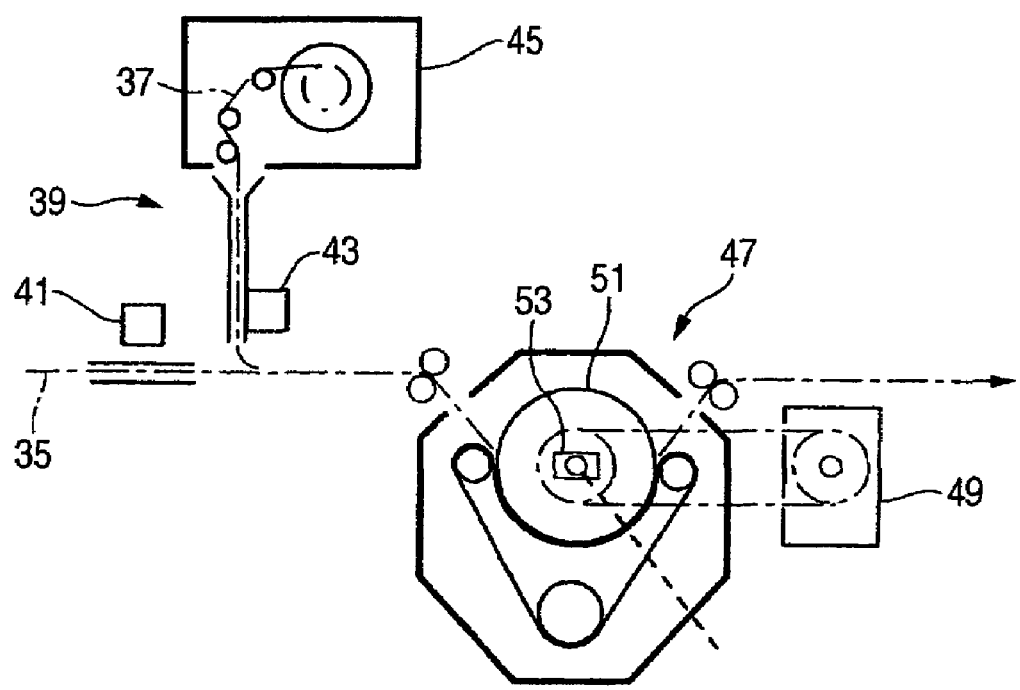
FIG. 12 is a constructive view of the major portion of a heat development device capable of feeding conventional cut recording materials and rolled recording materials.

By employing such a swinging structure for the drive droller 77, when the tip portion 69a of the recording material 69 to be transported into the press portion 83 of the guide plate 79 reaches the drive roller 77, as illustrated in FIG. 9A, the drive roller 77 is aligned in the leaving direction from the press portion 83, whereby fluctuation of the recording material conveyance rate caused by collision contact between the tip portion 69a of the recording material 69 and the drive roller 77, i.e., fluctuation of the sub-scanning rate, is prevented. And, after the tip portion 69a of the recording material 69 has passed through the drive roller 77, as illustrated in FIG. 9B, the drive roller 77 is swinged and rolled on the recording material 69.

By employing such a construction, it is possible to eliminate fluctuation of the conveyance rate of the recording material 69 caused by collision contact between the tip portion 69a of the recording material 69 and the drive roller 77, i.e., fluctuation of the sub-scanning rate. As a result, it is possible to prevent disturbance of the recorded image caused by the fluctuation of the conveyance rate of the recording material 69.

According to the foregoing image forming device 150 of the present invention, the guide plate 79 for guiding while coming into contact with the back surface of the recording material 69 and drive rollers 75, 77 for conveying the recording material 69 while pressing it onto the guide plate 79 are provided, and the slope portion 81 protruded in the laser irradiation direction is formed in only one end portion of the conveyance direction of the guide plate 79. Accordingly, it is possible to make the production easy as compared with conventional guide plates in which the slope portion 81 is provided in both end portions of the conveyance direction. As a result, the production costs of device can be reduced by employing the plate sub-scanning mode capable of making the structure simple and realizing smooth conveyance of the recording material 69.

Incidentally, in the foregoing embodiments, while the case of recording using laser irradiating light as recording means has been described as one example, the invention is not limited thereto. Recording by an inkjet mode or line exposure such as LED and EL may be employed.

What is claimed is:

1. An image forming device comprising:
    a recording unit for recording to a recording material in a sheet form in a major scanning direction based on an image signal to be input; and
    a conveyance unit for conveying the recording material in a sub-scanning direction perpendicular to the major scanning direction,
    wherein the image forming device is provided with
        a guide plate for guiding the recording material while the recording material comes into contact with the guide plate on an opposite surface of a recording side, the guide plate being provided at an image recording position in which the recording material is recorded by the recording unit, and
        a drive roller for conveying the recording material while pressing the recording material onto the guide plate,
    wherein the guide plate has a planar portion along a conveyance direction and an inclined portion bent toward a side of the recording unit, and the inclined portion is formed in only one end portion of the conveyance direction of the guide plate.

2. The image forming device according to claim 1, wherein the recording unit is a laser irradiation unit for irradiating the recording material with a laser light modulated based on the image signal.

3. The image forming device according to claim 1, wherein the image forming device comprises a first drive roller and a second drive roller which are aligned while sandwiching a conveyance path including the image recording position of the recording material, respective axis lines of the first drive roller and the second drive roller are in parallel to the conveyance path and perpendicular to the conveyance direction, the first drive roller is supported to face a vicinity of a bending point of the inclined portion, and the second drive roller is supported to face the planar portion of the guide plate.

4. The image forming device according to claim 3, wherein the second drive roller is supported in such a manner that the second drive roller can freely approach to or leave from the planar portion, thereby making it possible to achieve nip or nip release of the recording material.

5. The image forming device according to claim 1, wherein the recording material is a rolled body wound in a rolled shape.

6. The image forming device according to claim 5, wherein the image forming device further comprises a recording material cartridge in a detachable manner, in which the rolled body is accommodated in a closed vessel having a light shielding property, and the recording material is sent out and fed into the conveyance unit.

7. The image forming device according to claim 5, wherein a curl direction of the recording material wound in the rolled shape and a bending direction of the recording material by the guide plate are set up in an opposite direction to each other.

8. The image forming device according to claim 5, wherein the image forming device further comprises a recording material cutting unit for cutting the recording material sent out from the recording material cartridge into a desired size, and wherein a distance $L_1$ from a recording material outlet of the recording material cartridge to the recording material cutting unit and a distance $L_2$ from the image recording position of the recording material to a central position of the second drive roller have a relation of $L_1 \geqq L_2$.

9. The image forming device according to claim 8, wherein after a tip of the recording material has reached the image recording position, the recording material is subjected to idle feeding in a length of the distance $L_2$, and writing is then started.

10. The image forming device according to claim 5, wherein the image forming device further comprises a recording material cutting unit for cutting the recording material sent out from the recording material cartridge into a desired size, and wherein a distance $L_1$ from a recording material outlet of the recording material cartridge to the recording material cutting unit and a distance $L_2$ from the image recording position of the recording material to a central position of the second drive roller have a relation of $L_1 \leqq L_2$.

* * * * *